United States Patent [19]
Fleming et al.

[11] 3,880,713
[45] Apr. 29, 1975

[54] CEPHALOSPORIN COMPOUNDS
[75] Inventors: Ian Dunlop Fleming, Saint Peter;
Michael Keith Turner, Wembley;
Eunice Jean Napier, Mattingley, all of England
[73] Assignee: Glaxo Laboratories Limited,
Greenford, Middlesex, England
[22] Filed: May 7, 1974
[21] Appl. No.: 467,733

[30] Foreign Application Priority Data
May 10, 1973 United Kingdom............... 22380/73

[52] U.S. Cl............................... 195/80 R; 195/36 P
[51] Int. Cl............................................... C12d 9/00
[58] Field of Search ........................... 195/80, 36 P

[56] References Cited
UNITED STATES PATENTS
3,801,464    4/1974    Gorman et al................... 195/80 R Primary Examiner—A. Louis Monacell
Assistant Examiner—Robert J. Warden
Attorney, Agent, or Firm—Bacon & Thomas

[57] ABSTRACT

A process for the N-deacylation of a 7β-phenoxyacetamido cephalosporin which comprises subjecting the cephalosporin to the action of an amidohydrolase enzyme which is derived from a bacterial source, e.g. *Erwinia aroideae*, which is free from cells and deleterious enzymes, which is stabilised in solution by the presence of ferrous ions and which is effective to cause optimal N-deacylation at a pH of from 3.5 to 6.5.

6 Claims, No Drawings

CEPHALOSPORIN COMPOUNDS

This invention relates to improvements in methods of N-deacylating 7β-acylamido cephalosporin derivatives using enzymes.

The cephalosporin compounds referred to in this specification are generally named with reference to "cepham", (see J.Am.Chem.Soc. 1962, 84, 3400). The term "cephem" refers to the basic cepham structure with a single double bond.

7β-Acylamido cephalosporin derivatives may be obtained by fermentation methods or as products of the ring expansion of penicillin derivatives and the corresponding 7β-amino derivatives are usually produced by N-deacylating the cephalosporin derivatives obtained. It is well known that purely chemical N-deacylation requires highly specific reagents and conditions partly having regard to the instability of the β-lactam ring and partly having regard to the nature of the 7β-acylamido group. Chemical N-deacylation processes which are commercially viable are usually multi-stage processes requiring the use of a number of reagents in sequence. Chemical process of N-deacylation are not generally suitable for application to the treatment of cephalosporins having unprotected 4-carboxyl groups whereas enzyme methods can be used for such reactions.

Enzymes that hydrolyse acylamido side-chains from penicillins and other amides are known and many organisms which produce such enzymes have been found. These amidohydrolase enzymes are broadly classified by their acylamido specificity, pH optimum and source. It has been generally observed, however, that bacterial enzymes of this type have been most effective in catalysing the hydrolysis of phenylacetamido groups (optimally at a pH of about 7), whereas fungal enzymes of this type have been most effective for catalysing the hydrolysis of phenoxyacetamido groups (optimally at a pH of about 10). A further characteristic of enzymes of both these types has been the relatively high level of product inhibition they exhibit, a fact which is disadvantageous to their industrial application.

Vandamme et al., *Ann. Inst. Pasteur* (1971), 121,(4), 435–446 have more recently reported that penicillin V (phenoxymethylpenicillin) may be deacylated at a low pH by a bacterial enzyme. In their experiments, penicillin V was found to be hydrolysed at a pH of around 5 by a suspension of *Erwinia aroideae* cells accompanied by reacylation of the resulting 6-aminopenicillanic acid.

We have now found that the N-deacylation of 7β-phenoxyacetamido cephalosporins may be effected at an optimal pH on the slightly acidic side without substantial reacylation of the resulting 7β-aminocephalosporin by using cell-free bacterial enzymes. However, in order to achieve satisfactory yields with cell-free material we have found that it is necessary to stabilise the cell-free enzyme in solution during the N-deacylation in order to maintain the enzyme in a state sufficiently active for the period needed for successful deacylation to elapse.

It will be appreciated that in general terms it is advisable to effect the N-deacylation of 7β-phenoxyacetamido cephalosporins at a neutral or slightly acidic pH to avoid destruction of the β-lactam ring in contrast to the use of a pH of about 10 employed when using fungal enzymes.

According to the invention, therefore, we provide a process for the N-deacylation of a 7β-phenoxyacetamidocephalosporin which comprises subjecting the cephalosporin to the action of an amidohydrolase enzyme derived from a bacterial source, which is free from cells and deleterious enzymes, which is stabilised in solution by the presence of ferrous ions and which is effective to cause optimal N-deacylation at a pH from 3.5 to 6.5. The resulting 7β-amino cephalosporin may thereafter be extracted and isolated.

An enzyme that is particularly suitable for the process of the invention is one derived from *Erwinia aroideae*, though enzymes that are derived from other bacterial species and which are effective at a pH from 3.5 to 6.5 may also be used successfully.

In the preparation of cell-free extracts of the organism, the cells may be stored and inocula prepared by conventional means. The cells may then be grown in a conventional culture medium comprising e.g. sources of nitrogen, carbon, hydrogen, oxygen, phosphorus, sulphur and minerals in water, the pH being adjusted before autoclaving. The flasks are incubated for a suitable length of time under rotation and cells are harvested, e.g. by centrifugation, from the culture fluid, and washed before disruption. The cells may then be suspended in a buffer and disrupted, e.g. ultrasonically, or by grinding, for example with glass beads. Cell debris is removed from the resulting material by e.g. centrifugation, leaving a residual extract containing the amidohydrolase. This may, if desired, be purified further by conventional means.

We have found it essential to stabilise the enzyme with ferrous ions. The cell-free enzyme loses a substantial amount of its activity during N-deacylation if these are not present. It is interesting to note that ferrous ions appear to be unique for our purpose. Moreover, it is unusual to stabilise amidohydrolases with ferrous ions. They may be added before or after disruption of the cells, desirably in the form of a water-soluble non-chelated ferrous salt e.g. ferrous sulphate or ferrous ammonium sulphate. The ferrous ions are preferably used in a concentration of from 0.1 to 1.0 mM, e.g. about 0.2 mM. The optimum point of addition may be ascertained by simple experimentation, but it is important that the pH of the solution after their addition be kept below about 6.5 so that the production of ferric ions, which have an inhibitory effect on the enzyme, is minimised.

The activity of the enzyme may be improved by the addition to the enzyme solution of an activator, for example a thiol e.g. dithiothreitol, dithioerythritol, β-mercaptoethanol, cysteine, glutathione or lipoic acid (as, for example, lithium lipoate) or ascorbic acid.

Amidohydrolase activity may be assayed by incubation of a quantitatively known amount of substrate and enzyme at the pH of the reaction, followed by quenching, isolation of the 7β-amino cephalosporin formed and its estimation. One unit of activity is the amount of enzyme which hydrolyses 1 μmole of substrate per min. under the defined conditions. It is found that each 1 ml. of *Erwinia aroideae* broth yields about 5 units of enzyme.

In an embodiment according to the invention, 3-methyl-7β-phenoxyacetamidoceph-3-em-4-carboxylic acid may be incubated with the amidohydrolase derived from *Erwinia aroideae*, and ferrous ions at a pH of from 4.5 to 6.5, preferably from 5.0 to 6.0 e.g. at 37°C for 2 hours. Buffering of the reaction solution to the correct pH may be achieved by the use of, for example, the alkali metal salt of an organic acid such as sodium acetate or potassium 3,3-dimethylglutarate. The reaction may be quenched in a suitable manner, for example by heating at 100°C for 5 minutes and then cooling the mixture, or by chilling in ice. Coagulated protein may be centrifuged off and the supernatant solution concentrated. The solution is preferably applied to a strongly basic quaternary ammonium anion-exchange resin column, e.g. Dowex-1, preferably in the acetate form, whence the product is eluted with an eluting agent, for example an aqueous solution of ammonium acetate.

This eluate, containing the 7β-amino-3-methylceph-3-em-4-carboxylic acid, may be evaporated to dryness and the residue dissolved in water. By adjusting the pH with aqueous acid, preferably HCl, to about the isoelectric point i.e. 3.5, 7β-amino-3-methylceph-3-em-4-carboxylic acid precipitates. This may then be filtered off and washed, e.g. with acetone. Alternatively, the 7-β-amino-3-methylceph-3-em-4-carboxylic acid may be precipitated directly from the eluate by adjusting the pH to about the isoelectric point. 7β-Amino-3-methylceph-3-em-4-carboxylic acid is found not to inhibit the *Erwinia aroideae* enzyme at its optimum pH to any significant extent.

The enzyme may be added directly as an aqueous solution to the reaction solution to be catalysed. It may also be added in solid form obtained, for example, by freeze drying. Again, the enzyme may be used in an immobilized form in or on a suitable matrix. This can take a variety of forms which include, for example, the occlusion of the enzyme in a matrix, for example, a glass or an artificial polymer e.g. cellulose triacetate in fibrous form, or insolubilisation on a membrane. Such immobilized forms are described, for example in British Pat. No. 1,224,947 and in Belgian Patent No. 782,646.

Although the enzyme is operative under conventional aqueous conditions at a pH from 3.5 to 6.5 it has been found that when the enzyme is immobilized in or on a suitable matrix the reaction medium can have a slightly higher pH, viz ca. pH 7–8.

The following method may be used to assay amidohydrolase activity. The procedure is essentially similar to that of the invention. One unit of activity may be defined as the amount of enzyme which hydrolyses one μmole of 3-methyl-7β-phenoxyacetamidoceph-3-em-4-carboxylic acid per minute under the following conditions:

A digest contains 3-methyl-7β-phenoxyacetamidoceph-3-em-4-carboxylic acid (20 μmole), acetic acid (15 μmole), adjusted to pH 5 with sodium hydroxide, ferrous sulphate (50 nmoles), dithiothreitol (3 μmole) and enzyme, in a total volume of 0.25 ml. After incubating at 37°C for 15 minutes the digest is stopped by heating at 100°C for 5 minutes, and the precipitate is centrifuged off, 0.5 mls 1M. acetic acid is added to the supernatant and the mixture loaded onto a 2.5 × 0.6 cm column of Dowex-1×8 acetate (200–400 mesh). The 7β-amino-3-methylceph-3-em-4-carboxylic acid released during the hydrolysis is eluted with 5 ml 1M. acetic acid. The total eluate is made up to 6 ml with 1M. acetic acid and the amount of 7β-amino-3-methylceph-3-em-4-carboxylic acid estimated by its absorbance at 260 nm. The molar extinction coefficient of this compound at 260 nm in 1M. acetic acid is taken to be $7.6 \times 10^3$ litre.mol.$^{-1}$.cm$^{-1}$.

In order that the invention may be well understood the following Examples are given by way of illustration:

EXAMPLE 1

Preparation of 7β-amino-3-methylceph-3-em-4-carboxylic acid a. *Erwinia aroideae* NRRL B-138, ATCC 25206, was grown in 250 ml baffled shake flasks containing 50 ml culture medium at pH 7.3, using a 1% inoculum from a 24 hour nutrient broth culture. Each litre of production medium contained 5 g peptone (Evans Medical Co. Ltd), 3 g sodium chloride, 20 g sucrose, 8 g Oxoid Lab. Lemco, and 5 g Oxoid yeast extract. The flasks were incubated at 28° for 40 hr. while being shaken at 220 rpm. The cells from 5 litres of medium were harvested by centrifugation, and washed with 0.05M phosphate buffer at pH 6.8. After suspending the cells in 600 ml of 0.05M phosphate buffer pH 6.8 containing 0.2mM FeSO$_4$ and 5mM β-mercapto-ethanol, they were broken by sonication.

The cell debris was removed by centrifugation and cetyl trimethyl ammonium bromide was added to the supernatant to give a final concentration of 1%. The precipitate was centrifuged off, and enough FeSO$_4$ was added to the supernatant to give a final concentration of 2mM. The pH of the extract was then lowered to 4.5 with acetic acid. The protein which precipitated was centrifuged off, and the supernatant was dialyzed against 50mM acetate buffer pH5 containing 0.2mM FeSO$_4$ and 5mM β-mercapto-ethanol. After dialysis the extract contains about 7 units amidohydrolase per ml.

b. 10 g (27 m mole) 3-methyl-7β-phenoxyacetamidoceph-3-em-4-carboxylic acid was hydrolysed in 250 ml water at 37°. The water also contained 30 m moles acetic acid adjusted to pH 4.5 with NaOH, 100 μmoles FeSO$_4$, 1.4 mmole β-mercapto-ethanol and 1350 units of the amidohydrolase. After 2 hr. the mixture was heated to 100° for 5 min., and then adjusted to pH 7 with KOH. Coagulated protein was centrifuged off at 800 g for 5 min. The supernatant was concentrated to 100 ml and was run onto a 15 × 2.5 cm column of Dowex-1 acetate. The 7β-amino-3-methylceph-3-em-4-carboxylic acid was elulted with M ammonium acetate.

The fraction of the eluate which contained 7β-amino-3-methylceph-3-em-4-carboxylic acid was evaporated to dryness, and the ammonium acetate removed under vacuum. 7β-amino-3-methylceph-3-em-4-carboxylic acid was then dissolved in 100 ml water at pH 8. The pH of this solution was lowered to 3.5 with 5N HCl. The solid which precipitated at 0° was filtered off, washed with cold 1 mM HCl, acetone and ether, and then dried. 3.73 g solid containing 16 m mole 7β-amino-3-methylceph-3-em-4-carboxylic acid was recovered (Yield 59%).

The product was identified by paper chromatography. Whatman 3 MM paper was buffered at pH 6 with 50 mM phosphate (5.9 g potassium dihydrogen phosphate, 1.85 g disodium hydrogen phosphate per litre). After the organic phase of a butan-1-ol:ethanol:water (4:1:5 v/v) mixture has run down the paper overnight, the product appears as a U.V. absorbing spot. This spot stains brown with ninhydrin and has the same $R_f$ value as authentic 7β-amino-3-methylceph-3-em-4-carboxylic acid. Comparison of U.V., I.R. and NMR data of the isolated and authentic compound confirms the identity.

EXAMPLE 2

Preparation of 3-methyl-7β-aminoceph-3-em-4-carboxylic acid using cellulose triacetate fibres containing an amidohydrolase derived from *Erwinia aroideae*.

a. *Erwinia aroideae* cells NRRL B-138, ATCC 25206, are removed from 130–140 litres of fermentation harvest broth by centrifugation, at 6300 rev./min using a Westfalia KO2006 chamber bowl type centrifuge. The cells (approx. 4 kg) are suspended to 10% w/v in cold (5°C) 20 mM imidazole HCl buffer pH 5.0, containing 2 mM ferrous ammonium sulphate (0.8 g/litre) and 5 mM β-mercaptoethanol (0.35 ml/litre), using a Silverson AX mixer for 15 min.

The bacterial cells are then disrupted by three passes through an A.P.V. homogeniser type KF3 at 7500–8000 p.s.i., the effluent being cooled by a passage through a heat exchanger. To the homogenised suspension 0.5% centrimide (as a 5% w/v solution) is slowly added and the suspension stored for up to 16 h to allow the precipitate to form. Polyethylene glycol P2000 antifoam (0.5 ml/litre) is added, the cell debris and precipitated proteins are then separated by centrifugation again using the Westfalia KO2006 centrifuge.

2 mM ferrous ammonium sulphate and 5 mM β-mercaptoethanol are added to the solution and the enzyme precipitated using a 2 stage addition of cold isopropanol. 40% v/v isopropanol precipitates much inactive material, a further 100% v/v precipitates the active fraction. The solids are recovered after each stage using the Westfalia KO2006 centrifuge.

The activity is extracted from the 140% isopropanol solid twice using a Vortex mixer (5 min) and then a magnetic stirrer at 4°C (16 h) into 20 mM pH 5.0 imidazole HCl buffer containing 2 mM ferrous ammonium sulphate and 5 mM β-mercaptoethanol. The first extraction is at about 10% w/v of solid and the second at about 20% w/v. The insoluble material is removed by centrifugation at 2100 g at 4°C for up to 16 h.

Cold isopropanol (1¼ vol.) is slowly added to the bulked enzyme solution and the solid recovered at 2100 g 4°C for 10 min. This solid is again extracted as before in 20 mM imidazole HCl buffer containing ferrous ammonium sulphate and β-mercaptoethanol to about 1 litre. Excess isopropanol is removed using a rotary film evaporator and the solution, clarified at 23000 g for up to 16 h, is freeze dried.

b. The freeze dried amidohydrolase was dissolved in 50 mM acetate buffer (adjusted to pH 5.0 with sodium hydroxide) containing 0.2 mM ferrous ammonium sulphate and 30% v/v glycerol. A solution containing 50 mg protein per ml was immobilised in cellulose triacetate fibres prepared as described in Example 1 of Belgian Pat. No. 782646.

The fibres (0.29g dry weight; activity 70 units/mg) were packed into a 1.25 cm diameter tube through which 50 mM acetate buffer pH 5.0 containing 0.2 mM ferrous ammonium sulphate and 1 mM dithiothreitol was circulated. 1g of 3-Methyl-7β-phenoxyacetamidoceph-3-em-4-carboxylic acid was dissolved at pH 5.5 in 60 ml water containing 7.5 mg dithiothreitol and 0.4 mg ferrous ammonium sulphate. This solution was warmed and circulated past the fibres in place of the buffer. The solution was kept at 37°. The released phenoxyacetic acid was titrated to pH 6.0 with 0.9 N-ammonium hydroxide. In 3 hours 58% of the substrate was hydrolysed as assessed by high-pressure liquid chromatography.

The circulating solution was collected and adjusted to pH 1 with hydrochloric acid. Unchanged substrate was extracted with methylisobutylketone after which the pH was raised to 8 with ammonia. The solution was cooled to 6° and the pH lowered to 4.0 with hydrochloric acid. After 2 hours 3-methyl-7β-aminoceph-3-em-4-carboxylic acid was filtered off, washed with water and acetone and dried at 40°. This solid (0.23 g) was isolated with NMR and IR spectra similar to that of authentic 3-methyl-7β-aminoceph-3-em-4-carboxylic acid. The $E_{1cm}^{1\%}$ at 264 nm (λ-max) was 329 and the purity judged by high-pressure liquid chromatography was 95%.

We claim:

1. A process for the production of 7-amino-3-methylceph-3-em-4-carboxylic acid which comprises contacting 3-methyl-7β-phenoxyacetamidoceph-3-em-4-carboxylic acid with an amidohydrolase enzyme derived from *Erwinia aroideae* which is free from cells and deleterious enzyme and which is stabilised in solution by the presence of ferrous ions in a concentration of from about 0.2 mM to about 1.0 mM.

2. A process for the production of 7-amino-3-methylceph-3-em-4-carboxylic acid when comprises contacting 3-methyl-7β-phenoxyacetamidoceph-3-em-4-carboxylic acid with an amidohydrolase enzyme derived from a bacterial source which is free from cells and deleterious enzymes, which is stabilised in solution by the presence of ferrous ions in a concentration of from about 0.2 mM to about 1.0 mM and which is effective to cause optimal production of said 7-amino-3-methylceph-3-em-4-carboxylic acid at a pH from about 3.5 to about 6.5.

3. A process as defined in claim 2 wherein the reaction is facilitated by the presence of a thiol selected from the group consisting of dithiothreitol, dithioerythritol, β-mercaptoethanol, cysteine, gluthathione, and lipoic acid.

4. A process as defined in claim 2 wherein the enzyme is employed as an aqueous solution thereof.

5. A process as defined in claim 2 wherein the enzyme is insolubilised in or on a polymer matrix.

6. A process as defined in claim 2 wherein the enzyme is derived from *Erwinia aroideae* NRRL B-138.

* * * * *